United States Patent [19]
Schneider, Jr. et al.

[11] Patent Number: 5,873,050
[45] Date of Patent: Feb. 16, 1999

[54] METHOD OF ANALYZING CAPABILITIES OF MULTIPLE-SUPPRESSION COMPUTER SEISMIC DATA PROCESSING SOFTWARE

[75] Inventors: William A. Schneider, Jr.; L. Don Pham, both of Houston, Tex.

[73] Assignee: Exxon Production Research Company, Houston, Tex.

[21] Appl. No.: 878,921

[22] Filed: Jun. 19, 1997

[51] Int. Cl.⁶ .................................................. G06F 19/00
[52] U.S. Cl. .............................................................. 702/14
[58] Field of Search ................................. 367/24, 73, 52; 702/14, 16, 17, 18

[56] References Cited

U.S. PATENT DOCUMENTS

| | | | |
|---|---|---|---|
| 4,766,574 | 8/1988 | Whitmore, Jr. et al. | 702/18 |
| 4,887,243 | 12/1989 | Pann | 367/24 |
| 5,051,960 | 9/1991 | Levin | 367/24 |
| 5,309,360 | 5/1994 | Monk et al. | 702/17 |
| 5,583,825 | 12/1996 | Carrazzone et al. | 702/17 |

OTHER PUBLICATIONS

Hron, F., *Geophysics*, vol. 51, 1986, pp. 710–735.
O'Brien, M.J., *The Leading Edge*, Jan. 1996, pp. 17–22.
Press, W.H., Numerical Recipes in Fortran, 2nd ed.: Cambridge Univ. Press, 1992, pp. 51–58.

*Primary Examiner*—Donald E. McElheny, Jr.
*Attorney, Agent, or Firm*—A B. Kimball, Jr.

[57] ABSTRACT

Computer-implemented methods of processing seismic data for the purpose of suppression of multiple reflections, or multiples, are subjected to quantitative evaluation. The evaluation is done by a computerized testing procedure. A known earth model is formed. From this model, data composed of primary reflections only, and data containing multiple reflections only are generated. These are retained separately, but a third data set representing their sum is also formed to serve as an original data set for processing. The original data set or sum is then processed by the processing method being evaluated. The processed results are then decomposed by a time-varying, least squares technique into primaries-only and multiples-only components. The decomposed primaries-only and multiples-only components so formed are then compared against the values of the original sets from the known earth model. The comparisons made are visual as well as numerical, quantitative comparisons, which may include simple difference plots, full- or partial-trace energy comparisons, or plots of least-squares decomposition coefficients. Users thus are provided with indications of how the processing techniques may be expected to perform on real data.

19 Claims, 8 Drawing Sheets

METHOD OF ANALYZING CAPABILITIES OF MULTIPLE-SUPPRESSION COMPUTER SEISMIC DATA PROCESSING SOFTWARE

BACKGROUND OF THE INVENTION

1. Field of the Invention

The present invention relates to quality control of seismic data processing. Specifically, the present invention involves computerized evaluation of seismic data processing software for suppression and removal of multiple reflections or multiples.

2. Description of the Related Art

Multiple reflections, or multiples, are present in the results of virtually every seismic exploration survey. They are, however, undesirable since their presence can mask or interfere with the meaningful reflections, known as primary reflections or primaries, which are of interest in geophysical exploration. Presently available seismic data processing software usually includes some form of multiple-suppression software.

Multiple-suppression software has generally attempted to identify and remove multiple reflections from seismic data, while simultaneously preserving primary reflections. Multiple suppression has been one of the classic geophysical problems, and there have been many different approaches, each generally optimized for a specific type of multiple (e.g., water-bottom, interbed, short-period, and the like). The effectiveness of any particular multiple-suppression method was generally data-dependent. Also, since approximations varied, different implementations of an algorithm have performed differently. This has made it difficult for users to quantify the accuracy of any particular type or set multiple-suppression software.

So far as is known, multiple-suppression software has generally been tested by creating synthetic data from a known earth model, processing these data with some multiple-suppression software, and visually examining the results. This approach was largely qualitative, allowing different observers to reach different conclusions. This approach also did not quantify how well multiples were suppressed and how well primaries were preserved. Also, when the synthetic data contained many primary and multiple reflections, the data displays would often become quite cluttered or "busy," revealing little helpful information for evaluation purposes during visual examination.

SUMMARY OF THE INVENTION

Briefly, the present invention provides a new and improved method of forming comparative plots to enable quantitative evaluation of the functionality of a computer software program for suppressing or removing multiple reflections or multiples in seismic data. According to the present invention, a first or primary reflection data set containing primary reflections only is created from a known earth model. A second or multiple reflection data set, containing multiple reflections only, is also created from the same earth model.

The first and second data sets are then summed to form a test data set, which is then processed with the software program being evaluated. The processed results are then decomposed in the computer into primaries-only and multiples-only components. The components obtained from the decomposed processed results are then compared with the original components used to create the test data set.

With the present invention, the evaluation or comparison portion of the process may be quantitative. This is done as a result of the decomposition of the processed (multiple-suppressed) data into primaries-only and multiples-only components, which then may be evaluated against the primaries-only and multiples-only components of the original data. The method of the present invention thus involves creating accurate synthetic data (satisfying ray or wave theory), processing the data to suppress multiples, decomposing the processed data, and then quantitatively evaluating the results. It requires that the primaries-only and multiples-only components of the original synthetic data are known. Many modeling techniques can yield such data sets, including ray methods, and wave methods, where absorbing surface boundaries can be turned off or on to yield data with or without surface multiples.

The decomposition according to the present invention is preferably a time-varying, least-squares technique that separates the processed data into its residual, primaries-only and multiples-only components, based on knowledge of the primaries-only and multiples-only components of the original data. The results of the decomposition processing are then available for quantitative comparison with the original data set. Thus, an analyst may display the primaries-only components, from the original data and the processed data, side by side for comparison, and then do the same for the multiples-only components as well as the complete data sets (primaries plus multiples). These plots yield quick visual conclusions about the multiple-suppression performance. The user or analyst may use various quantitative means of measuring the similarities or differences between the pairs of data. By separating the primaries from the multiples a better understanding of how the processing software treated each component is readily available.

According to the present invention, realistic synthetic data are thus created from a known earth model, in the form of a set of primaries-only data and a set of multiples-only data. The two data sets are retained separately after they are created, but also summed together to create an original test data set. The original test data set is then processed with the multiple-suppression software being evaluated.

The processed data are then decomposed in the computer into primaries-only and multiples-only components. This is preferably done with a time-varying, least-squares technique that makes use of the original primaries-only and multiples-only data.

The primaries-only data sets and the multiples-only data sets in each case are then compared, the original with the decomposition results, to quantify what the processing software did to the original data. The comparisons may be visual or numerical or both. Examples of numerical comparisons are simple difference plots, full- or partial-trace energy comparisons (trace energy being the sum of the squares of the trace amplitudes over some time range), and also plots of the least-squares decomposition coefficients.

DETAILED DESCRIPTION OF THE PREFERRED EMBODIMENT

1. Synthetic Test Data Set Formation

The present invention provides an analyst or user with the capability of quantitative and computerized evaluation of the capabilities of seismic data processing software. More specifically, the software to be evaluated is seismic data processing software for suppression or removal of multiple reflections, also known as multiples in the art. In order to have a reference point or baseline for the purposes of comparison or evaluation, with the present invention the initial step or procedure is that of forming or creating an accurate synthetic seismic data set. This synthetic data set is a simulation or representation of data comparable to that which will be processed by the multiple-suppression software being evaluated. It is also typically preferable that the synthetic data set resemble as closely as possible data actually obtained in seismic surveys.

The synthetic data set can be formed by several known modeling techniques, such as either wave equation modeling techniques or ray tracing methods. It is typically necessary that the data of the original synthetic data set be separable into a component data set, containing primary reflections only, or a "primaries-only" component; and another component data set, containing multiple reflections only, or a "multiples-only" component. As mentioned previously, there are several conventional methods known for creating synthetic data sets in this manner. For example, a ray method modeling technique which yields the "primaries-only" and "multiples-only" components of the type discussed above is disclosed in "Synthetic Seismic Sections for Acoustic, Elastic, Anisotropic and Vertically Inhomogenous Layered Media," Hron et al., *Geophysics*, Vol. 51, No. 2, pp. 710–735, 1986. Similarly, a wave equation modeling technique which can provide separate "primaries-only" and "multiples-only" components of the requisite type is that used and discussed in "Can We Image Beneath Salt?" O'Brien et al., *The Leading Edge*, pp. 17–22, January, 1996.

The realistic synthetic data are thus formed by known modeling methods from a known earth model, and primaries-only data and multiples-only data are obtained. The primaries-only and multiples-only components are then retained separately. Additionally, an "original" test data set is also formed. This is done by summing the two component sets (primaries-only and multiples-only) together, trace by trace, to create such an original test data set.

The original test data set so obtained is then processed in a data processing computer with the set or suite of multiple-suppression software under evaluation. The resultant data set is then available for processing to decompose the processed data into its primaries-only and multiples-only components. This is preferably done with a time-varying, least-squares technique that makes use of the original primaries-only and multiples-only data from the synthetic data set.

2. Time-Varying, Least-Squares Decomposition of Processing Results

Decomposition of the processing results may be done in several ways. In the embodiment herein described, decomposition is performed one trace at a time (single-channel), and operates within a sliding time window. This is done because the simplest method of decomposition is that performed one trace at a time. The result of decomposition processing gives a time-varying decomposition of a processed trace into its primaries-only and multiples-only components. This single-channel method accepts data in any sort order (common-shot, common-receiver, common-midpoint, common-offset). It should be understood, however, that multi-channel decomposition may be performed, if desired. Further, more sophisticated least squares inversion techniques described below may also be used, if desired.

The process of decomposition of the output results from the multiple-suppression software under evaluation is as follows: Let $B(t)=P(t)+M(t)$ represent a seismic trace from the original data, where $P(t)$ and $M(t)$ represent the original primaries-only and multiples-only components, respectively. Let $D(t)$ represent the same trace in the processed data (after multiple suppression). $P(t)$, $M(t)$, and $D(t)$ are the knowns. The process decomposes $D(t)$ into its primaries-only and multiples-only components, $\hat{P}(t)$ and $\hat{M}(t)$, such that $D(t)=\hat{P}(t)+\hat{M}(t)$ in a least-square sense. $\hat{P}(t)$ and $\hat{M}(t)$ are the unknowns.

The analytic signals of $P(t)$ and $M(t)$ are defined as $$\tilde{P}(t) = P(t) + iP^*(t),$$

and $$\tilde{M}(t) = M(t) + iM^*(t), \tag{1}$$

where $P^*(t)$ and $M^*(t)$ are the Hilbert transforms or quadratures of $P(t)$ and $M(t)$, respectively, and $i^2 = 1$.

Then a local decomposition of $D(t)$ is $$\begin{aligned} \hat{D}(t) &= \hat{P}(t) + \hat{M}(t) \\ &= Re\{\alpha \tilde{P}(t) + \beta \tilde{M}(t)\} \\ &= c_1 P(t) + c_2 P^*(t) + c_3 M(t) + c_4 M^*(t), \end{aligned} \tag{2}$$

where $\alpha = c_1 - i\, c_2$ and $\beta = c_3 - i\, c_4$ are arbitrary complex constants. Moduli $|\alpha|$ and $|\beta|$ indicate how the original primaries and multiples, respectively, in $B(t)$ were scaled by the multiple-suppression process in producing $D(t)$ (optimally, $|\alpha|=1$ and $|\beta|=0$). Arguments, $\arg(\alpha)$ and $\arg(\beta)$, indicate how the original primaries and multiples, respectively, in $B(t)$ were phase shifted by the processing (optimally, $\arg(\alpha)=0$ and $\arg(\beta)=0$). The $c_j$, for $j=1$ to 4, are the least-squares decomposition coefficients. Thus far, the values for $c_j$ are constant, but they may be converted into time-variable form, as will be discussed below.

An estimate is formed of the $c_j$, for $j=1$ to 4, at some time $t=\tau$, by minimizing the squared error, $$\epsilon^2(\tau) = \sum_{t=\tau-\Delta\tau}^{\tau+\Delta T} [D(t) - \hat{D}(t)]^2 \tag{3}$$

with the method of least squares over a time window of data, a window being defined as some finite range of time. Here, $\Delta T$ is the window half-width signifying a window of data centered about $t=\tau$.

The least-squares normal equations are obtained by differentiating Equation (3) above with respect to each of the $c_j$ and equating to zero. The result is as follows:

$$\begin{pmatrix} P_tP_t & P_t^*P_t & M_tP_t & M_t^*P_t \\ P_tP_t^* & P_t^*P_t^* & M_tP_t^* & M_t^*P_t^* \\ P_tM_t & P_t^*M_t & M_tM_t & M_t^*M_t \\ P_tM_t^* & P_t^*M_t^* & M_tM_t^* & M_t^*M_t^* \end{pmatrix} \cdot \begin{pmatrix} c_1 \\ c_2 \\ c_3 \\ c_4 \end{pmatrix} = \begin{pmatrix} D_tP_t \\ D_tP_t^* \\ D_tM_t \\ D_tM_t^* \end{pmatrix} \quad (4)$$

where we have used the notation $$P_tM_t^* = \sum_{t=\tau-\Delta\tau}^{\tau+\Delta T} P(t)M^*(t) \quad (5)$$

for the elements of Equation (4) above.

An estimate of $c_j$ is then made, for a time window centered about time $\tau$, by solving Equation (4) with the Singular Valued Decomposition (SVD) technique or other suitable alternative, obtaining a solution vector (containing the $c_j$) of smallest length, using the well-known method described by Press et al, *Numerical Recipes in FORTRAN*, (Cambridge University Press, 1992, p. 53–57). This method requires choosing a threshold $\epsilon$, which is the smallest allowed singular value divided by the largest singular value. Press et al, use $\epsilon=1.0e-6$, but it has been found that $1.0e-3$ is more appropriate for the present multiple-suppression software evaluation method. The choice of $\epsilon$ may also possibly be adjusted for machines, according to data word sizes. The use of SVD and $\epsilon$ are very important features to the success of this decomposition method here described.

Thus far the description has been regarding how to obtain a measure $c_j$ for one time $\tau$. It is now helpful and appropriate to describe how $c_j$'s that vary with time are obtained. The summation in Equation (3) ranges over discrete time samples, even though the equation is written for continuous time. The normal Equations (4) are solved once for each of a set of discrete $\tau$ values, $\tau_k=\tau_0+k\Delta\tau$, for $k=0, 1, \ldots, N$, producing $c_j(\tau_k)$. Interpolation between these discrete $c_j(\tau_k)$ samples is then performed to obtain the continuous time representations, $c_j(t)$.

Then, for continuous time, the primaries-only and multiples-only components of the decomposition of $D(t)$ are $$P'(t)=c_1(t)P(t)+c_2(t)P^*(t),$$

and $$M'(t)=c_3(t)M(t)+c_4(t)M^*(t). \quad (6)$$

As mentioned above, the $c_j(t)$ directly indicate how the multiple-suppression software scaled and phase-shifted the data during processing. Thus, these least-squares decomposition coefficients provide a quantitative measure of what the multiple-suppression software did to the data. A plot may then be formed these coefficients or the moduli and arguments of $\alpha$ and $\beta$ as diagnostics, mentioned previously above.

3. Illustrative Example

Figure 1:
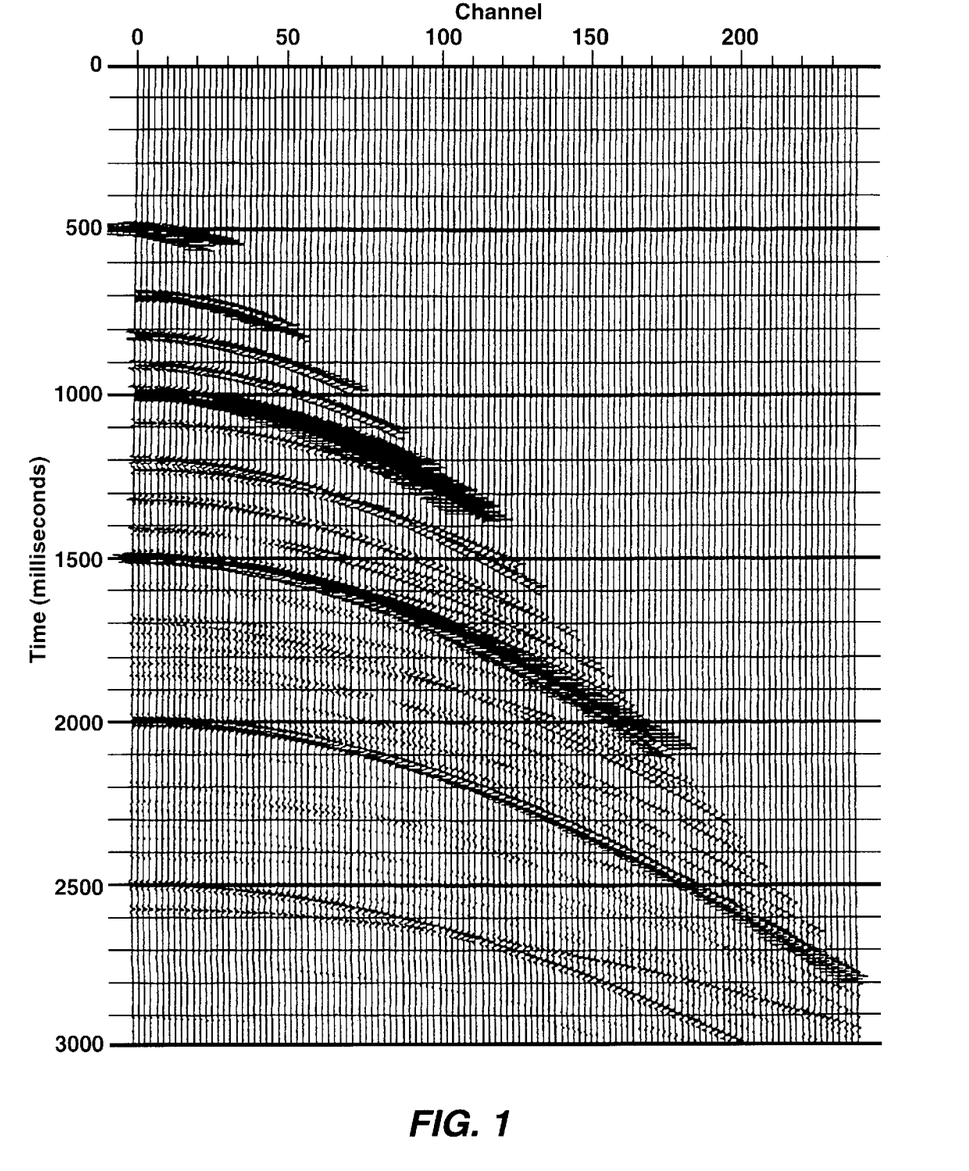
FIG. 1 is a plot of a synthetic seismic test data set formed from a known earth model for use with the present invention.

FIG. 1 is a display of a CMP gather created using the ray methods described in Hron et al., previously discussed. The data contained fifteen primary reflections and all water-bottom multiples, up to fourth-order, that were generated by these primaries. The data were processed with the known Radon transform method as a test model to remove the multiples for subsequent evaluation according to the present invention. The result was a CMP gather of FIG. 2. It is evident that much of the multiple energy has been removed, particularly at medium-far offsets, where the Radon method is known to be most effective.

Figure 2:
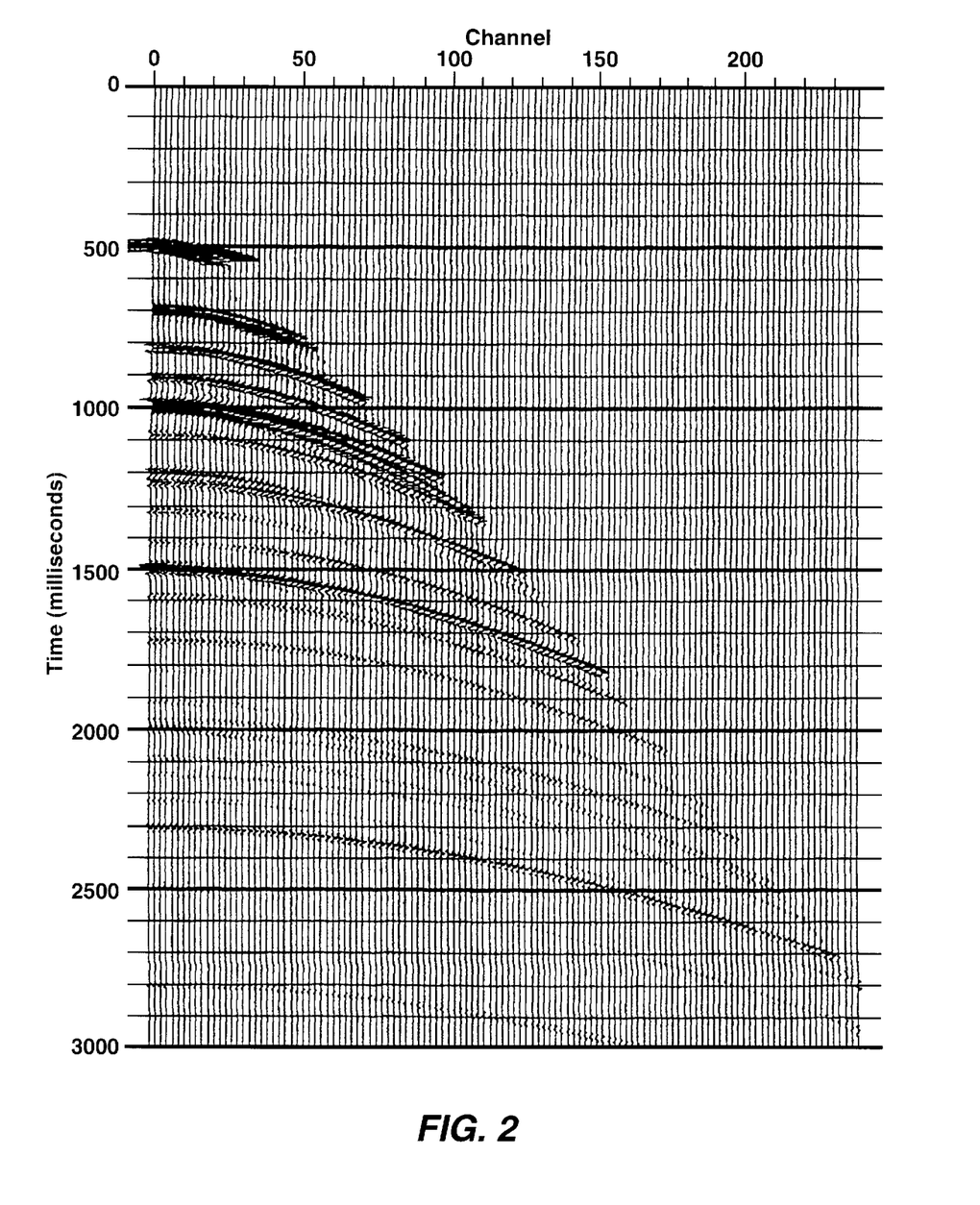
FIG. 2 is a plot of the seismic data of FIG. 1 after processing to remove multiple reflections using conventional processing methods.

Comparing FIGS. 1 and 2 does not reveal much more, because the primaries and multiples are mixed together in the displays. However, a phantom event with zero-offset time of 2300 ms can be seen in FIG. 2 that does not exist in FIG. 1. Phantom events such as this can be complicated to understand—they may be data-independent artifacts of the processing software, or they may be processing artifacts caused by synthetic data that did not contain a complete set of multiples.

Figure 3:
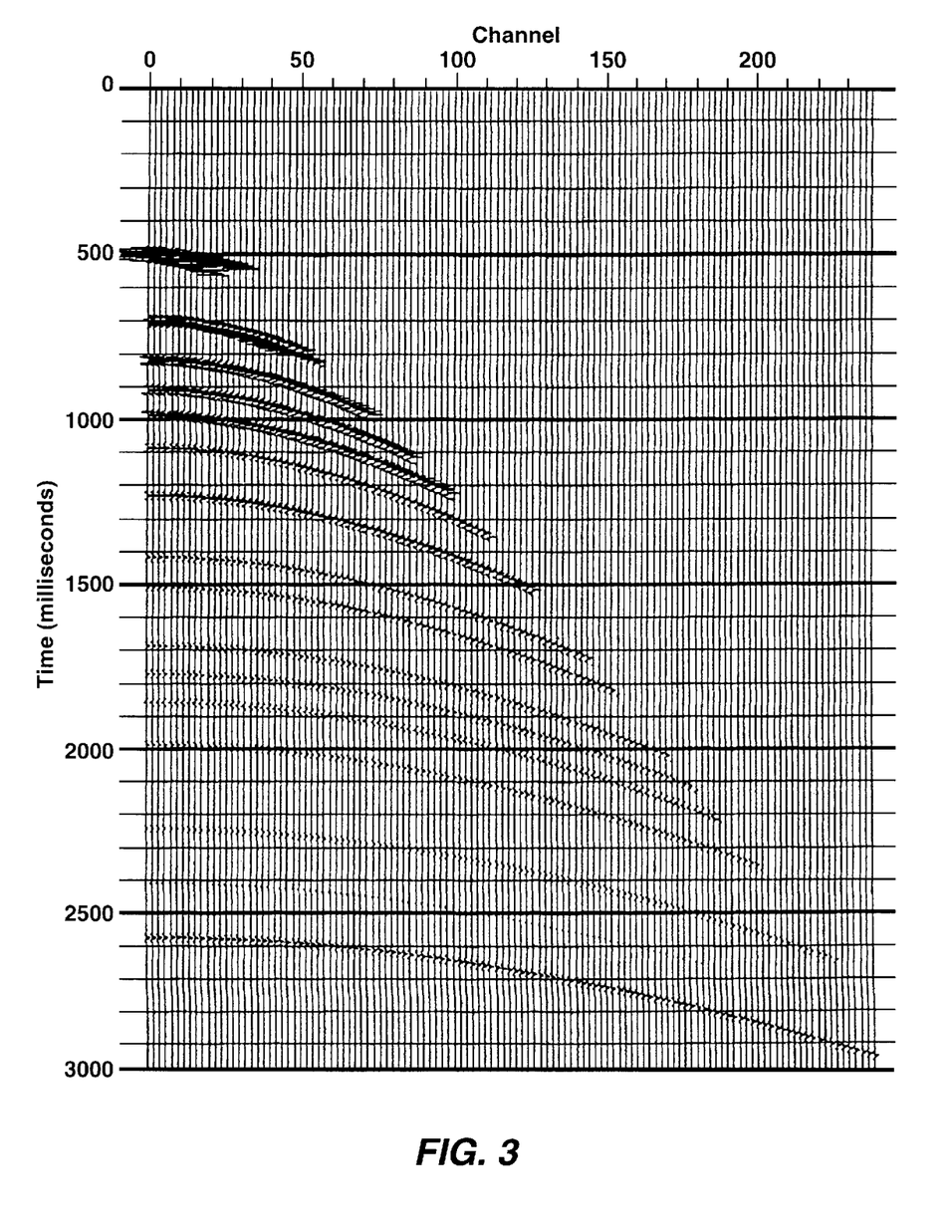
FIG. 3 is a plot of the primaries-only component of the seismic data of FIG. 1.
Figure 4:
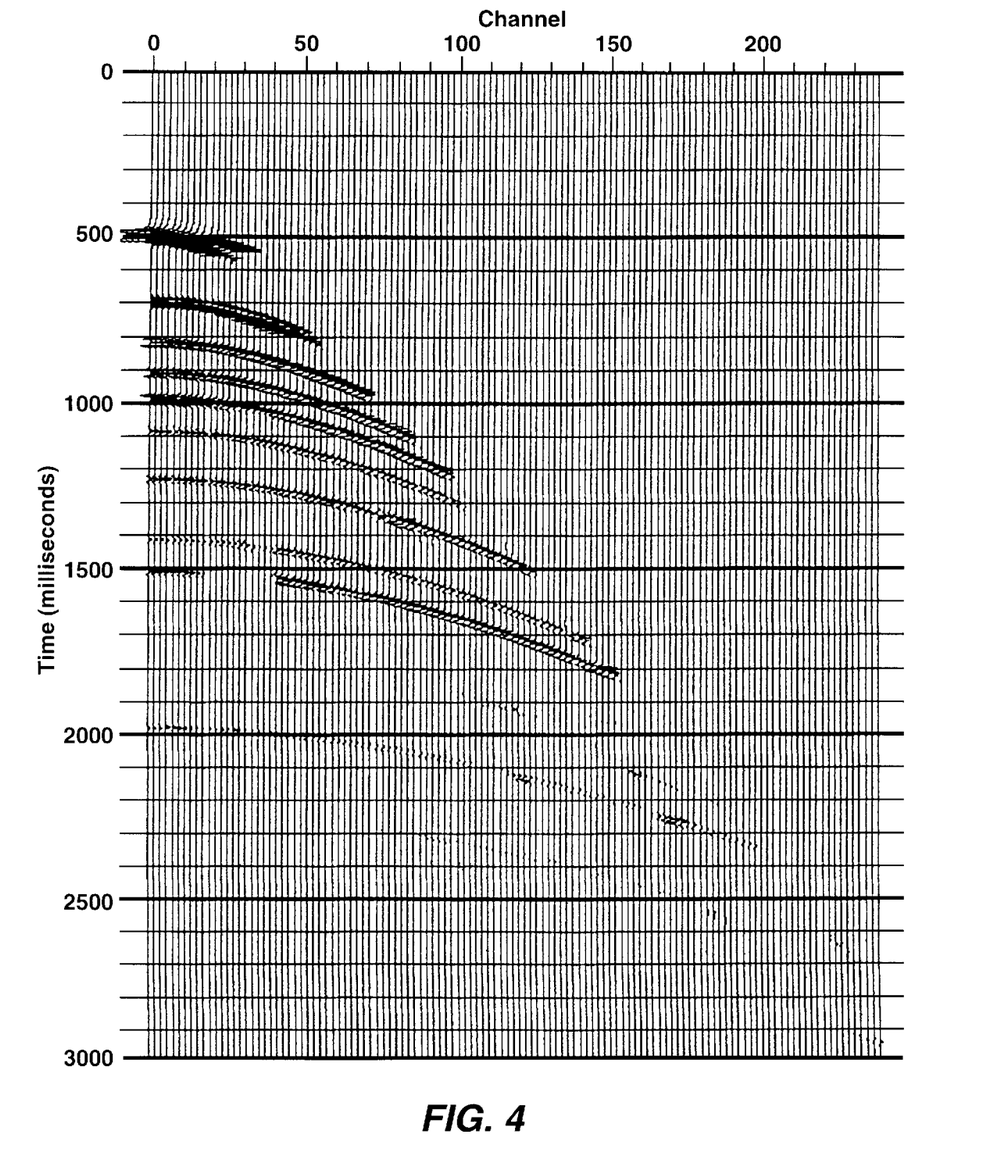
FIG. 4 is a plot of the primaries-only component of the data of FIG. 2.

FIGS. 3 and 4 show the primaries-only components from the CMP gathers of FIGS. 1 and 2, respectively. FIG. 3 contains the original primary reflections, and FIG. 4 contains the primaries-only decomposition of the processed gather. If processing had been perfect, than all multiples would have been removed and the primaries would have been passed unaltered, making the data in these two figures identical. As is apparent, this was not the case.

By comparing FIGS. 4, 3, and 2 one can see that the multiple-suppression software overamplified the primary reflection with a zero-offset time of 1500 ms. The software also attenuated many of the deeper primary reflections (compare FIGS. 3 and 4).

Figure 5:
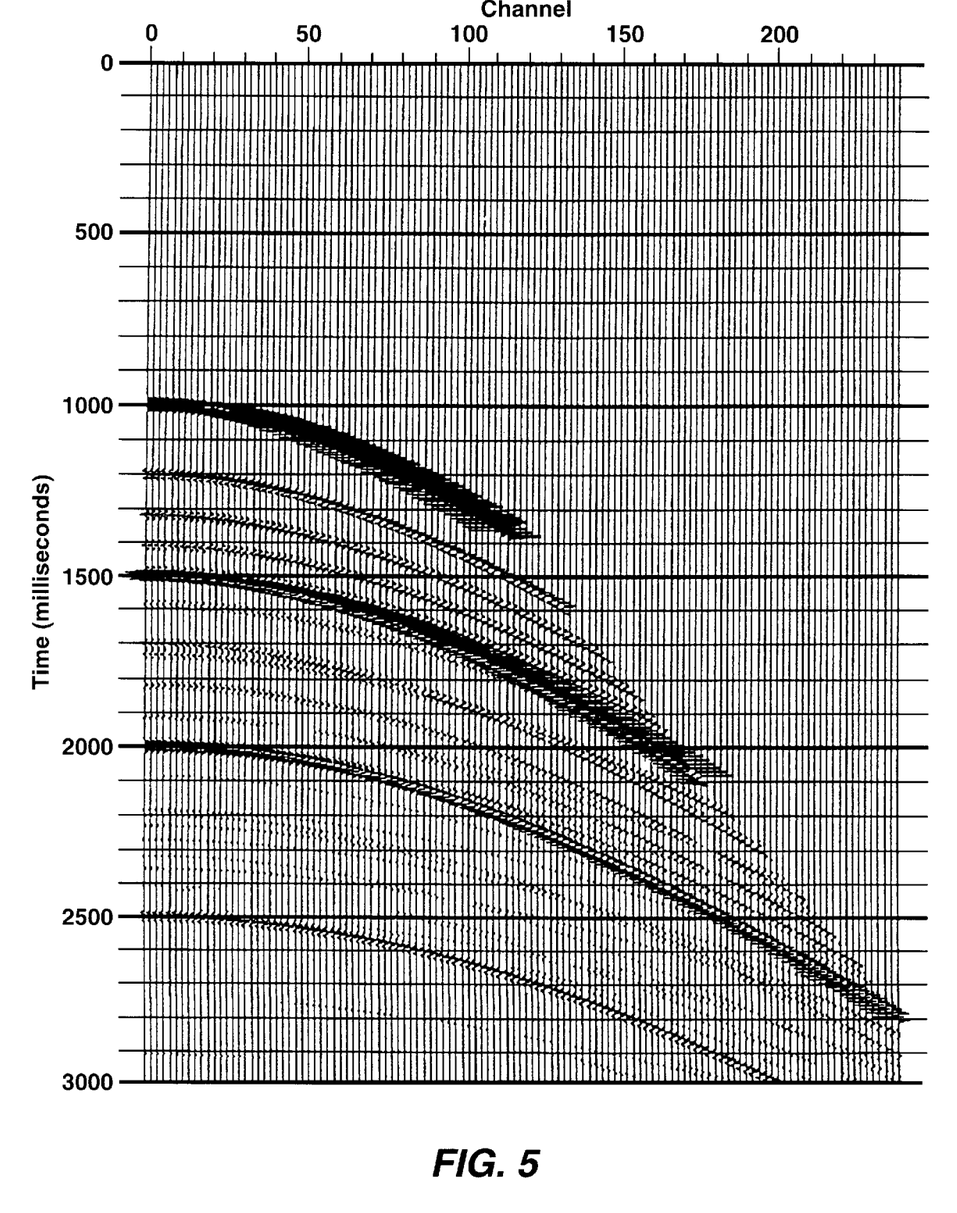
FIG. 5 is a plot of the multiples-only component of the seismic data of FIG. 1.
Figure 6:
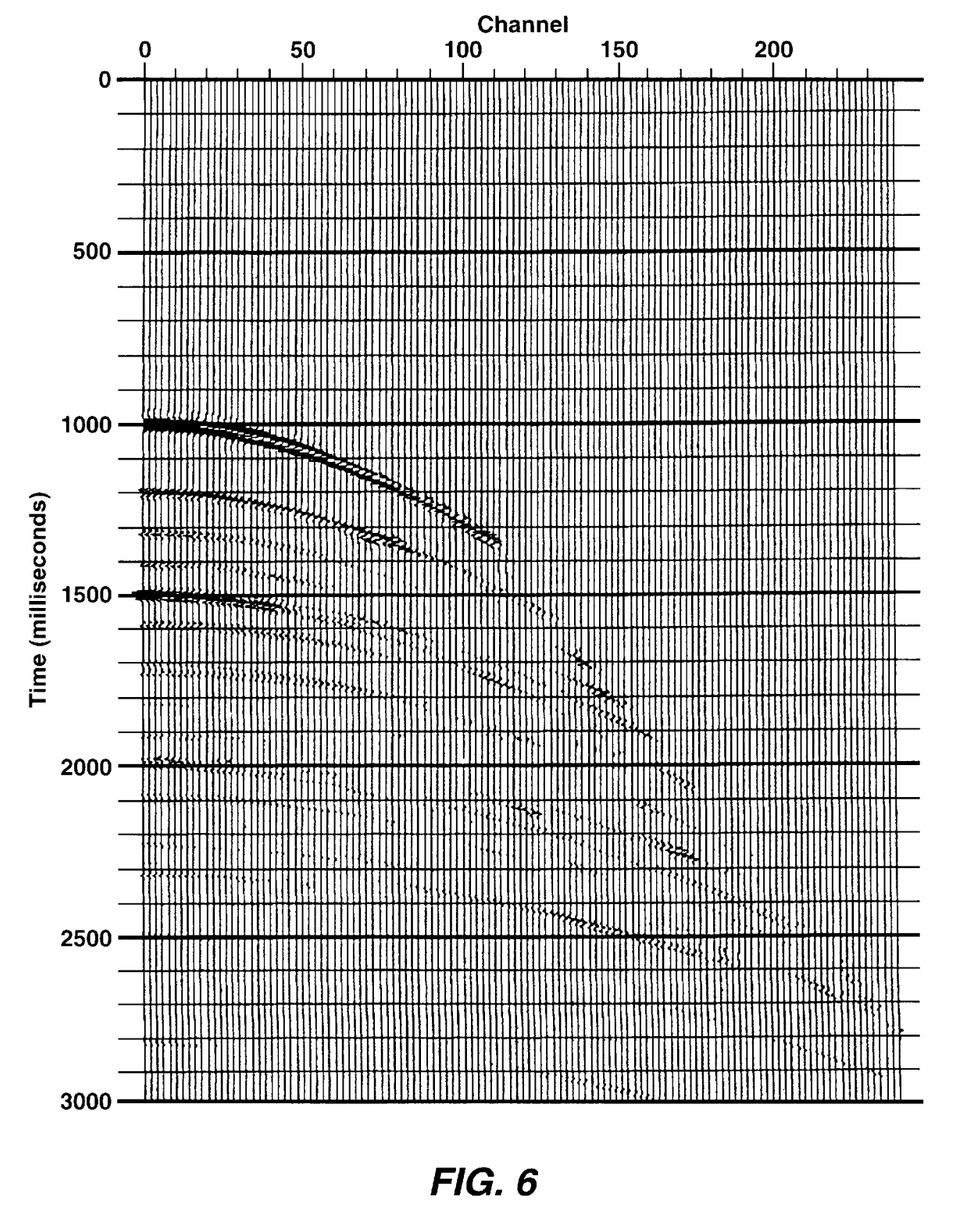
FIG. 6 is a plot of the multiples-only component of the seismic data of FIG. 2.

FIGS. 5 and 6 are the multiples-only equivalents of FIGS. 3 and 4. Again, if the Radon processing model being evaluated had been perfect, all multiples would have been removed, and FIG. 6 would be blank (all zeros). Instead one can see residual multiples there, although the processing did remove much multiple energy as can be seen by comparing FIG. 6 with FIG. 5.

Figure 7:
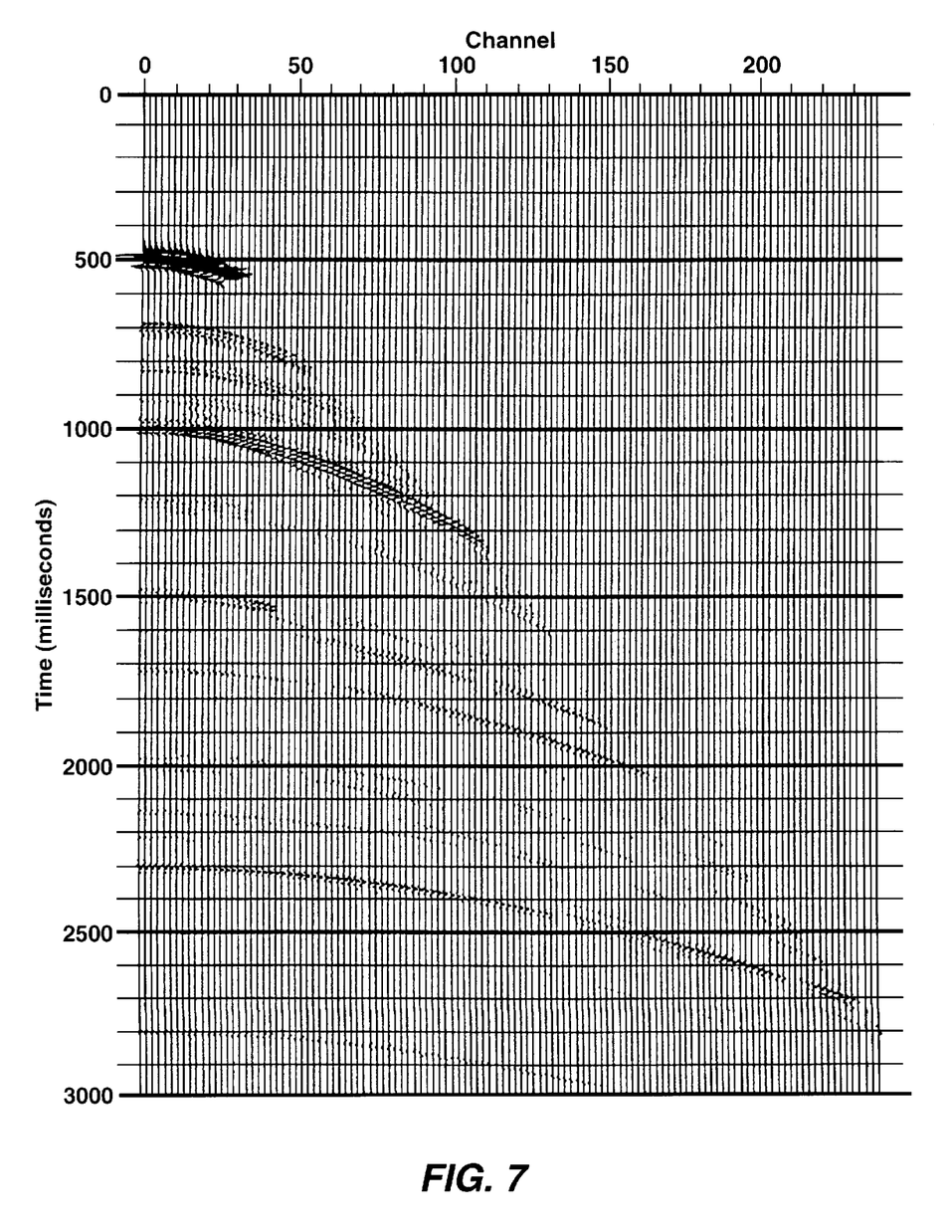
FIG. 7 is a plot of the seismic data gather of FIG. 2 with the data gathers of FIGS. 4 and 6 subtracted.

FIG. 7 is the CMP gather of FIG. 2 minus the sum of the CMP gathers of FIGS. 4 and 6. This is the least-squares decomposition error. Ideally, FIG. 7 should be blank, but it does contain some local errors indicating the least-squares model was not perfect. This type of results tends to occur where primaries and multiples closely overlap, making the decomposition nonunique, such as for the events with zero-offset time seen near 1000 ms. As noted above, more sophisticated least-squares inversion techniques could reduce the amount of error. FIG. 7 also picked up the previously-mentioned phantom event of FIG. 2 at 2300 ms. Since this event did not exist in the original data, the decomposition could not model it, and it appears in the error plot. The reason that the set multiple-suppression software under evaluation introduced this type of phantom event is unknown.

4. Processing Sequence

Figure 8:
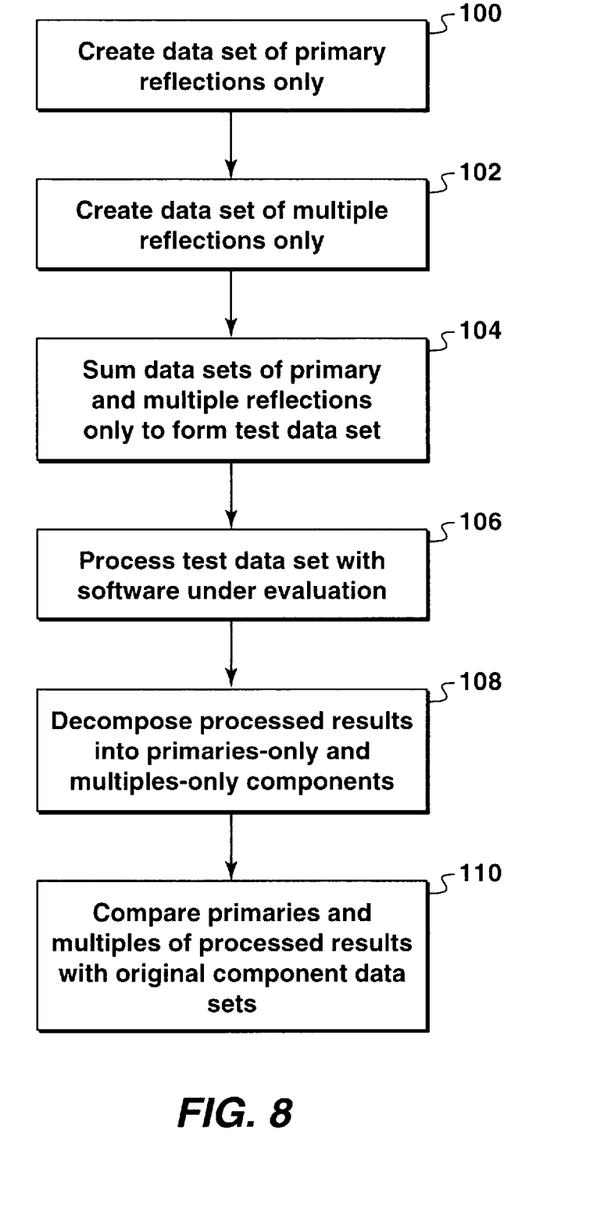
FIG. 8 is a schematic diagram or flow chart of the process steps of the present invention.

The implementation of the present invention is depicted schematically in FIG. 8. The data sets of primaries-only and multiples-only reflections, respectively, are created from the known earth model during steps 100 and 102. The data sets formed during steps 100 and 102 are then summed during step 104 to form the test data set.

Next, during step 106, the test data set is then processed using the multiple-suppression computer seismic data processing software under evaluation. The processed results from step 106 are then decomposed in the manner set forth above during step 108, resulting in primaries-only and multiples-only components. The resultant components of the processed results obtained from step 108 are then compared during step 110 against the original data sets.

Thus, it can be seen that the present invention permits computerized quantitative evaluation of multiple-suppression seismic data processing software. The processing is preferably performed with a digital computer of suitable computational capacity in terms of both speed and data volume. With the present invention, the evaluation process has been made quantitative. The method of the present invention decomposes the processed or multiple-suppressed data of the test data set into primaries-only and multiples-only components. The decomposed results may then be evaluated separately against the primaries-only and multiples-only components of the original data. The method of the present invention thus creates accurate synthetic data (satisfying either ray or wave theory), processes the data to suppress multiples, decomposes the processed data, and then quantitatively evaluates the results.

The decomposition is a time-varying, least-squares technique that separates the processed data into its residual primaries-only and multiples-only components, based on knowledge of the primaries-only and multiples-only components of the original data. Typically, the quantitative evaluation involves a display of the primaries-only components, from the original data and the processed data, side by side for comparison. The same is then done for the multiples-only components, as well as for the complete data sets (primaries plus multiples). These three sets of comparative plots yield quick visual conclusions about the multiple-suppression performance. Then, as discussed above, various quantitative techniques of measuring the similarities or differences between the pairs of data may be performed. With the present invention, by separating the primaries from the multiples, an analyst may better understand how the multiple-suppression processing software under evaluation treated each data component.

The foregoing disclosure and description of the invention are illustrative and explanatory thereof, and various changes in the size, shape, materials, and components, as well as in the details of the illustrated method of operation may be made without departing from the spirit of the invention.

What is claimed is:

1. A computer-implemented method for quantitative evaluation of the functionality of a computer software program for suppressing multiple reflections in seismic data, said method comprising the steps of:

creating a first synthetic data set composed of primary reflections only from a known earth model;

creating a second synthetic data set composed of multiple reflections only from the known earth model;

summing the first and second synthetic data sets to form a test data set;

processing the test data set with the multiple-suppressing software being evaluated;

decomposing the processed results into primaries-only and multiples-only components;

comparing a component of the decomposed processed results with one of the original synthetic data sets obtained from the known earth model.

2. The method of claim 1, wherein said step of comparing comprises the steps of:

obtaining a measure of the difference between the component of the decomposed processed results with one of the synthetic data sets obtained from the known earth model;

forming an output record of the measure of the difference so obtained.

3. The method of claim 2, wherein said step of obtaining a measure of the difference comprises the step of:

obtaining a measure of the difference in amplitude.

4. The method of claim 2, wherein said step of obtaining a measure of the difference comprises the step of:

obtaining a measure of the difference in full-trace energy level.

5. The method of claim 2, wherein said step of obtaining a measure of the difference comprises the step of:

obtaining a measure of the difference in partial energy level.

6. The method of claim 2, wherein said step of obtaining a measure of the difference comprises the step of:

obtaining a measure of the difference in least-squares decomposition coefficients.

7. The method of claim 1, wherein said step of comparing comprises the step of:

comparing the primaries-only component of the decomposed processed results with the first synthetic data set.

8. The method of claim 1, wherein said step of comparing comprises the step of:

comparing the multiples-only component of the decomposed processed results with the second synthetic data set.

9. The method of claim 1, wherein said step of decomposing the processed results comprises the step of performing a computerized least-squares decomposition of the processed results.

10. The method of claim 1, wherein said step of decomposing the processed results comprises the step of performing a computerized time-varying least-squares decomposition of the processed results.

11. A method for evaluating the functionality of a computer software program for suppressing multiples in seismic data, said method comprising the steps of:

creating a synthetic seismic data set containing both a known primaries-only component and a known multiples-only component from a known earth model;

processing said synthetic seismic data set with said computer software program to generate a multiple-suppressed synthetic seismic data set;

decomposing said multiple-suppressed synthetic seismic data set into a processed primaries-only component and a processed multiples-only component; and comparing said known primaries-only component to said processed primaries-only component and said known multiples-only component to said processed multiples-only component to determine the effectiveness of said computer software program in suppressing the multiples in said synthetic seismic data set.

12. The method of claim 11, wherein said step of comparing said known primaries-only component to said processed primaries-only component and said known multiples-only component to said processed multiples-only component is done visually.

13. The method of claim 11, wherein said step of obtaining a measure of the difference comprises the step of:

obtaining a measure of the difference in amplitude.

14. The method of claim 11, wherein said step of comparing said known primaries-only component to said processed primaries-only component and said known multiples-only component to said processed multiples-only component is done by quantitatively measuring the differences between said known and processed components.

15. The method of claim 11, wherein said step of comparing said known primaries-only component to said processed primaries-only component and said known multiples-only component to said processed multiples-only component is done by comparing the trace energies of said known and processed components.

16. The method of claim 11, wherein said step of decomposing said multiple-suppressed synthetic seismic data set uses a time-varying, least-squares decomposition.

17. The method of claim 16, wherein said time-varying, least-squares decomposition comprises the steps of:

(a) selecting a data trace, D(t) from said multiple-suppressed synthetic seismic data set and representing said data trace by the following decomposition:

$$D\hat{}(t)=c_1P(t)+c_2P^*(t)+c_3M(t)+c_4M^*(t),$$

where $D\hat{}(t)$ is the local decomposition of D(t), P(t) is the known primaries-only component of said data trace prior to processing, $P^*(t)$ is the Hilbert transform of P(t), M(t) is the known multiples-only component of said data trace prior to processing, $M^*(t)$ is the Hilbert transform of M(t), and $c_j$ (j=1 to 4) are the least-squares decomposition coefficients;

(b) dividing said data trace into a series of discrete time windows with window centers at $\tau_k = \tau_0 + k\Delta T$ (k=0,1, ... N,) and for each $\tau_k$ using the method of singular valued decomposition to determine the values of said least-squares decomposition coefficients, $c_j(\tau_k)$ which minimize the squared error, $\epsilon^2(\tau_k)$, according to the following equation:

$$\epsilon^2(\tau) = \sum_{t=\tau-\Delta\tau}^{\tau+\Delta T} [D(t) - D\hat{}(t)]^2 \quad (3)$$

where $\Delta T$ is the half-width of the time window centered at $\tau_k$;

(c) for each of said least-squares decomposition coefficients, $c_j$, interpolating between the discrete values, $c_j(\tau_k)$, calculated in step (b) to obtain the continuous time representation, $c_j(t)$, for said decomposition coefficient;

(d) determining the processed primaries-only component, P(t), and the processed multiples-only component, M(t), of said data trace from the following equations:

$$P\hat{}(t)=c_1(t)P(t)+c_2(t)P^*(t),$$

$$M\hat{}(t)=c_3(t)M(t)+c_4(t)M^*(t);$$

and (e) repeating steps (a) through (d) for the other data traces in said multiple-suppressed seismic data set.

18. The method of claim 17, wherein said step of comparing said known primaries-only component to said processed primaries-only component and said known multiples-only component to said processed multiples-only component comprises plotting said decomposition coefficients to determine how effectively said computer software program suppressed the multiples and preserved the amplitudes in said synthetic seismic data set.

19. The method of claim 18, wherein the decomposition components are complex functions $\alpha$ and $\beta$, having moduli $|\alpha|$ and $|\beta|$, and arguments arg ($\alpha$) and arg ($\beta$), respectively, and said step of plotting comprises the step of plotting said moduli $|\alpha|$ and $|\beta|$ and said arguments arg ($\alpha$) and arg ($\beta$).

* * * * *